United States Patent [19]

Lednicer

[11] 3,862,232

[45] Jan. 21, 1975

[54] 1-(P-HYDROXYPHENYL)-2-PHENYL-6-(2-DIETHYLAMINOETHOXY)-3,4-DIHYDRONAPHTHALENE AND THE SALTS THEREOF

[75] Inventor: Daniel Lednicer, Portage Township, Kalamazoo County, Mich.

[73] Assignee: The Upjohn Company, Kalamazoo, Mich.

[22] Filed: Dec. 16, 1968

[21] Appl. No.: 784,218

Related U.S. Application Data

[63] Continuation-in-part of Ser. No. 292,767, July 3, 1963, abandoned.

[52] U.S. Cl. 260/570.7, 260/239 RB, 260/243 B, 260/247.1, 260/247.7 C, 260/293.62, 260/293.85, 260/298.89, 260/295.5 S, 260/326.5 S, 260/326.5 B, 260/326.5 J, 260/343.7, 260/345.2, 260/345.9, 260/456 A, 260/459, 260/465 E, 260/465 F, 260/465 G, 260/501.12, 260/501.15, 260/501.18, 260/501.19, 260/515 M, 260/515 A, 260/518 R, 260/518 A, 260/519, 260/567.5, 260/567.6 M, 260/590, 260/592, 260/609 R, 260/611 A, 260/999

[51] Int. Cl. C07c 93/06

[58] Field of Search 26/576.6 M, 570.7, 501.18

[56] References Cited
UNITED STATES PATENTS

| | | | |
|---|---|---|---|
| 2,914,561 | 11/1959 | Allen et al. | 260/570 |
| 2,971,001 | 2/1961 | Palopoli et al. | 260/570 X |
| 3,164,607 | 1/1965 | Lednicer | 260/326.5 |
| 3,422,114 | 1/1969 | Huebner et al. | 260/570.7 X |
| 3,472,896 | 10/1969 | Seki et al. | 260/570.7 |
| 3,476,767 | 11/1969 | Bencze | 260/570.7 X |

OTHER PUBLICATIONS

Burger, "Medicinal Chemistry," 2nd Ed., pages 82–83 (1960).
Lednicer et al., "Chemistry Int. London," 1961, pages 2098–99 (1961).

*Primary Examiner*—Robert V. Hines
*Attorney, Agent, or Firm*—Willard L. Cheesman

[57] ABSTRACT

The novel compounds of the invention can be represented by the following formula:

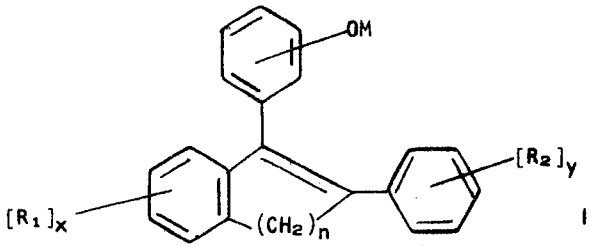

wherein M is selected from the class consisting of hydrogen and an alkali metal, $R_1$ and $R_2$ are each selected from the class consisting of lower-alkyl, lower-alkenyl, lower-alkoxy, lower-alkenyloxy, hydroxy, halogen, trifluoromethyl, lower-alkylmercapto, and at least one of $R_1$ and $R_2$ being

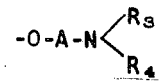

wherein A is an alkylene group containing from 2 to 6 carbon atoms, inclusive, $R_3$ and $R_4$ are selected from the class consisting of lower-alkyl and lower-alkyl linked together to form, with the attached nitrogen atom, a 5 to 7 ring atom saturated heterocyclic radical, $x$ and $y$ are integers from 0 to 4, inclusive, the sum of $x$ and $y$ being at least 1, and $n$ is an integer from 1 to 2, inclusive; the pharmacologically acceptable acid addition salts of those compounds of the above formula wherein M is hydrogen and at least one of $R_1$ and $R_2$ represents

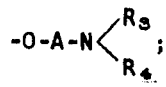

and the quaternary ammonium salts of those compounds of the above formula wherein M is hydrogen and at least one of $R_1$ and $R_2$ represents

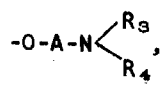

the anion of said quaternary ammonium salts being that of a pharmacologically (pharmaceutically) acceptable acid.

1 Claim, No Drawings

1-(P-HYDROXYPHENYL)-2-PHENYL-6-(2-DIETHYLAMINOETHOXY)-3,4-DIHYDRONAPHTHALENE AND THE SALTS THEREOF

CROSS REFERENCES TO RELATED APPLICATION

This application is a continuation-in-part of application Ser. No. 292,767, filed July 3, 1963 and now abandoned.

BRIEF SUMMARY OF THE INVENTION

This invention relates to novel phenolic diphenylbenzocycloalkenes and is more particularly concerned with 2-phenyl-3-(hydroxyphenyl)indenes and 1-(hydroxyphenyl)-2-phenyl-3,4-dihydronaphthalenes and with derivatives thereof, and with processes for their preparation.

The term "lower-alkyl" means an alkyl group containing from 1 to 8 carbon atoms, inclusive, such as methyl, ethyl, propyl, butyl, amyl, hexyl, heptyl, octyl, and isomeric forms thereof. The term "lower-alkenyl" means an alkenyl group containing from 2 to 8 carbon atoms, inclusive, such as vinyl, allyl, butenyl, pentenyl, hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, amyloxy, hexyloxy, heptyloxy, octyloxy, and isomeric forms thereof. The term "lower-alkenyloxy" means an alkenyloxy group containing from 2 to 8 carbon atoms, inclusive, such as vinyloxy, allyloxy, butenyloxy, pentenyloxy, hexenyloxy, heptenyloxy, octenyloxy, and isomeric forms thereof. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof. The term "alkylene group from 2 to 6 carbon atoms, inclusive" includes ethylene, propylene, butylene, amylene, hexylene, and isomeric forms thereof. The term "lower-alkyl linked together to form, with the attached nitrogen atom, a 5 to 7 ring atom saturated heterocyclic radical," is inclusive of pyrrolidino, lower-alkypyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethyleneimino, homopiperazino, homomorpholino, and the like.

The compounds having the formula (I) above can exist in the form of the free phenols or in the form of the salts thereof with alkali metals such as sodium, potassium, and lithium. Those compounds of the formula (1) wherein $R_1$ and/or $R_2$ represents

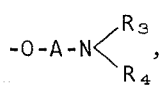

wherein $R_3$, $R_4$, and A have the significance hereinbefore defined, can also exist in the form of acid addition salts and quaternary ammonium salts. Said acid addition salts comprise the salts of the free bases of formula (1)  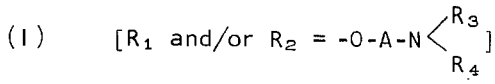

with pharmacologically (pharmaceutically) acceptable acids such as sulfuric, hydrochloric, nitric, phosphoric, lactic, benzoic, methanesulfonic, p-toluenesulfonic, salicyclic, acetic, propionic, maleic, malic, tartaric, citric, cyclohexylsulfamic, succinic, nicotinic, ascorbic acids, and the like. The anion of said quaternary ammonium salts is that of a pharmacologically (pharmaceutically) acceptable acid. Said quaternary ammonium salts comprise salts obtained by reacting the free bases of formula (1)  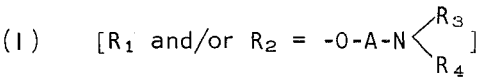

with quaternating agents, for example, lower-alkyl halides, lower-alkenyl halides, di(lower-alkyl) sulfates, aralkyl halides, lower-alkyl arylsulfonates, and the like. The terms "lower-alkenyl+ and "lower-alkenyl" have the significance hereinbefore defined. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower alkanols and arylsulfonic acids such as benzenesulfonic, toluenesulfonic, xylenesulfonic, and like acids. Examples of quaternary salts of the basic compounds of formula (1) are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl p-toluenesulfonate, ethyl p-toluenesulfonate, and the like.

The term "novel compounds of the invention" as used throughout the specification embraces the free phenols of formula (I), the alkali metal salts thereof, and the acid addition and quaternary ammonium salts of the compounds of formula (I).

The novel compounds of the invention exhibit biological activity. Thus, the novel compounds of the invention possess activity as antifertility, anti-inflammatory, antimicrobial, and central nervous system stimulating agents.

Because of their antifertility activity, the novel compounds of this invention are valuable for animal pest control. For example, the compounds of the invention are formulated in combination with baits and/or attractants and placed in feeding stations accessible to undesirable rodents and other small animals including Canidae such as coyotes, foxes, wolves, jackals, and wild dogs and birds such as starlings, gulls, redwing blackbirds, pigeons, and the like, thus reducing hazards to aviation by their presence on runways and in the vicinity of airfields, the spread of disease, and destruction to property in both rural and urban areas.

The anti-inflammatory activity of the compounds of the invention makes them useful in mammals, for example, in human therapy, when administered topically for the alleviation of inflammation and burns, and also in the treatment of atopic dermatitis and contact dermatitis.

For purposes of administration to mammals, including man and animals of economic value, the novel compounds of the invention can be combined with solid or liquid pharmaceutical carriers and formulated in the form of tablets, powder packets, capsules, and like dosage forms, using starch and like excipients, or dissolved or suspended in suitable solvents or vehicles, for oral or parenteral administration.

In addition to their biological activity, the compounds of the invention are also useful as intermediates. Illustratively, the free phenols of formula (I) can be reacted with the appropriate tertiary-aminoalkyl halide,

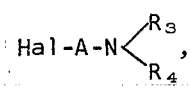

wherein $R_3$, $R_4$, and A have the significance above defined, in the presence of a base such as sodium hydroxide, potassium hydroxide, sodium methoxide and the like, to produce the corresponding tertiaryaminoalkyl ethers which are active as antifertility agents as more particularly disclosed in my copending applications Ser. No. 81,703, filed Jan 10, 1961, now U.S. Pat. No. 3,164,607, and Ser. No. 135,767, filed Sept. 5, 1961, and now abandoned, with subject matter of the latter transferred to Ser. No. 296,939, filed July 23, 1963, now U.S. Pat. No. 3,274,213, and to Ser. No. 589,511, filed Oct. 26, 1966, and in the publications of Lednicer et al., Chemistry and Industry 1961, p. 2098; ibid. 1963, p. 408.

The novel compounds having the formula (I) above can be prepared according to the following reaction scheme:

In the above formulae $R_1$, $R_2$, $x$, $y$, and $n$ have the significance hereinbefore defined and Hal represents halogen.

In the above reaction, the ketone (II) is reacted with the Grignard reagent (III) under conditions conventionally employed in conducting Grignard reactions. Thus, the reaction is carried out under anhydrous conditions, advantageously in the presence of an inert solvent such as dibutyl ether, diisopropyl ether, tetrahydrofuran, and the like. The preferred solvent is tetrahydrofuran. The reaction can be carried out at temperatures within the range of about 0°C. to about the boiling point of the solvent employed and is preferably carried out at elevated temperatures, for example, at or near the boiling point of the reaction mixture.

The reaction time varies within wide limits according to the temperature at which the reaction is conducted. Generally speaking, where the reaction is carried out at elevated temperatures such as the boiling point of the reaction mixture, it is necessary to employ a reaction time of the order of several hours to ensure completion of the reaction.

The Grignard reagent (III) employed in the reaction is formed from the tetrahydropyranyl ether of the appropriate halophenol and the tetrahydropyranyl ether group is still present in the reaction product obtained in the above-described reaction. The desired compound (I) can either by isolated as its tetrahydropyranyl ether and the latter group subsequently removed, or the ether grouping can be removed during the isolation procedure. In either event, the grouping is readily converted to a free hydroxy group by mineral acid hydrolysis. Preferably the ether group is hydrolyzed during the working-up procedure.

For example, the reaction mixture from the above-described Grignard reaction is decomposed by the addition of water, ammonium chloride, and the like, followed by separation of the organic layer and removal of the solvent therefrom. The residue [the tetrahydropyranyl ether of (I)] is then hydrolyzed, advantageously

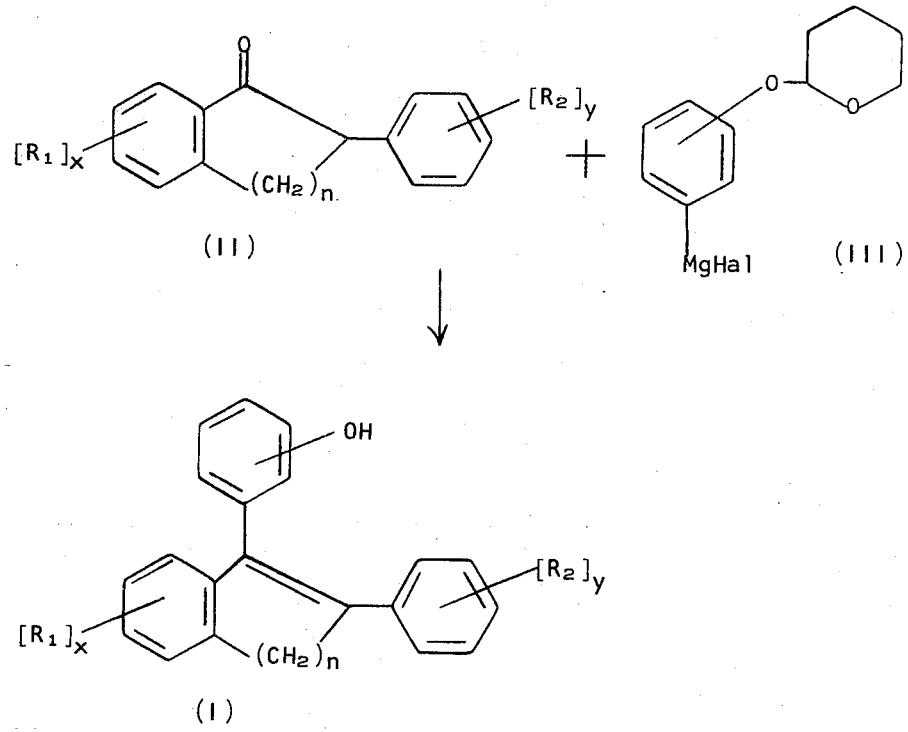

by allowing to stand in solution in a suitable inert organic solvent such as acetone, methanol, ethanol, or mixtures thereof with water, in the presence of aqueous mineral acid such as hydrochloric acid, hydrobromic acid, and the like.

The desired compound (I) is isolated from the hydrolysis mixture by conventional procedures, for example, by solvent extraction and is purified, if desired, by conventional procedures, for example, by chromatography, recrystallization, and the like.

In some cases, the desired compound (I) produced in the above-described reaction, is contaminated with appreciable quantities of the corresponding carbinol having the formula:

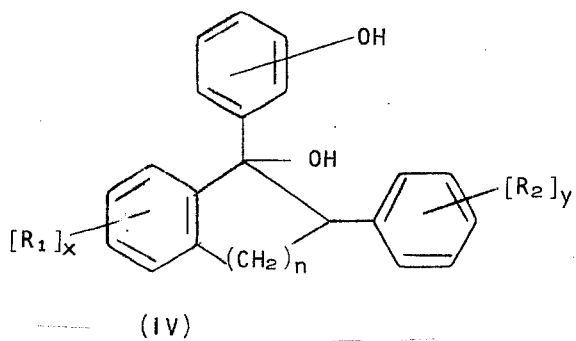

(IV)

wherein $R_1$, $R_2$, $x$, $y$, and $n$ have the significance above defined. Where such a mixture of the desired compound (I) and the corresponding carbinol (IV) are obtained, said mixture can be treated by procedures known to effect the dehydration of a tertiary carbinol whereby the carbinol is converted to the desired compound (I). The dehydration can be effected in most instances by heating the carbinol (IV) in a solvent such as benzene, toluene, xylene, and the like, which forms an azeotrope with water, in the presence of a trace of a strong acid such as hydrochloric, sulfuric, p-toluenesulfonic acids, and the like. The water which is formed in the dehydration is removed from the reaction mixture azeotropically. There is thereby obtained a solution of the desired compound (I) from which the latter can be isolated by evaporation or other conventional procedures. In certain cases, the dehydration of the carbinol (IV) requires more drastic conditions such as heating the compound at, or slightly above, its melting point, preferably in the presence of an inert gas, until elimination of water is complete.

When either of the groups $R_1$ and $R_2$ in the starting ketone (II) represent free hydroxy, it is necessary, before carrying out the Grignard reaction described above, to protect this group with a radical which can be removed subsequently to yield the desired compound (I) with a free hydroxy group or groups. A particularly convenient manner in which a free hydroxy group or groups in the starting ketone (II) can be so protected is by conversion to the corresponding tetrahydropyranyl ether. The latter conversion can be accomplished readily by treating the ketone (II) containing a free hydroxy group or groups with 2,3-dihydropyran in the presence of a trace of p-toluenesulfonic acid or a mineral acid such as hydrochloric acid, hydrobromic acid, and the like. After the ketone (II) with hydroxy group or groups protected in this manner has been converted to the corresponding tetrahydropyranyl ether of compound (I), the tetrahydropyranyl ether groups are hydrolyzed, in the same manner and at the same time as the tetrahydropyranyl ether group originating in the Grignard compound (III), to yield the free hydroxy group or groups.

The Grignard reagents (III) employed as starting materials in the above-described process of the invention are prepared by reaction of magnesium in an anhydrous inert organic solvent such as dibutyl ether, diisopropyl ether, tetrahydrofuran, and the like, with the appropriate halophenol in the form of its tetrahydropyranyl ether, using procedures well known in the art for the preparation of Grignard reagents. The halophenol tetrahydropyranyl ether is obtained from the halophenol using the procedure described above for the preparation of tetrahydropyranyl ethers.

The ketones (II) which are employed as starting materials in the above-described process of the invention are prepared as follows. Those ketones (II) wherein n is 1, i.e., those compounds of formula (II) which are indanones, except those wherein $R_1$ and/or $R_2$ represent hydroxy, alkenyloxy, or

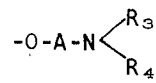

as defined above, can be prepared according to the following reaction scheme:

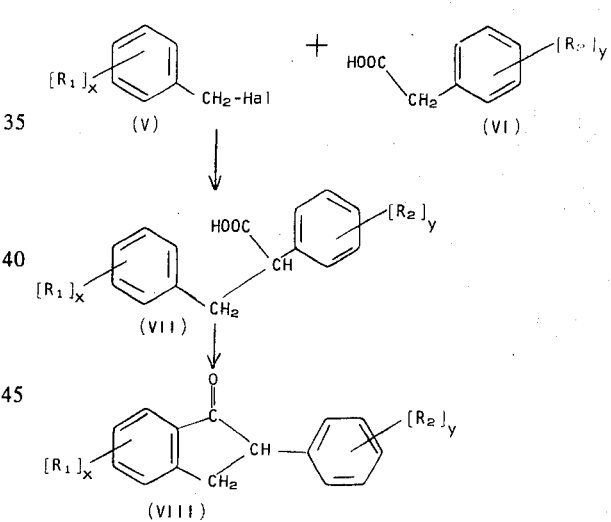

In the above formulae $R_1$, $R_2$, $x$, and $y$ have the significance hereinbefore defined, with the exceptions noted above, and Hal represents halogen. It is to be noted that the benzyl halide (V) must be unsubstituted in at least one of the ortho positions in order that the compound (VII) can be cyclized as described below. The reaction of the phenylacetic acids (VI) with the benzyl halides (V) to give the corresponding α-phenylhydrocinnamic acids (VII) can be effected, for example, using the procedure described by Hauser and Chambers, J. Am. Chem. Soc. 78, 4942, 1956, for the preparation of α-phenylhydrocinnamic acid from phenylacetic acid and benzyl chloride. The α-phenylhydrocinnamic acids (VII) can also be prepared by Perkin condensation of a phenylacetic acid (VI) with the appropriately substituted benzaldehyde followed by reduction of the intermediate α-phenylcinnamic acid so obtained. The procedure employed in this alternate synthesis is preferably that described by Solmssen, J. Am. Chem. Soc. 65, 2370, 1943.

The α-phenylhydrocinnamic acids (VII) so obtained are then cyclized to the required indanones (VIII) in the presence of a Lewis acid, using the general procedure described by Fieser and Hershberg, J. Am. Chem. Soc. 61, 1272, 1939. The term "Lewis acid" is well known in the art and is defined succinctly by Fieser and Fieser, "Organic Chemistry," Third Edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the α-phenylhydrocinnamic acids (VII) according to the above procedure comprises adding the acid (VII) to liquid hydrogen fluoride with stirring and then allowing the hydrogen fluoride to evaporate at room temperature. The desired indanone (VIII) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The indanone (VIII) so obtained can be purified, if desired, by conventional procedures, for example, by distillation.

The indanones of formula (VIII) wherein $R_1$ and/or $R_2$ represents hydroxy can be prepared conveniently by dealkylation of the corresponding compounds of formula (VIII) in which $R_1$ and/or $R_2$ represents alkoxy. The dealkylation can be effected using conventional methods, for example, by heating with aluminum chloride or bromide in the presence of an inert solvent such as benzene, xylene, and the like.

The indanones of formula (VIII) wherein $R_1$ and/or $R_2$ represents alkenyloxy can be prepared conveniently by alkenylation of the corresponding compounds wherein $R_1$ and/or $R_2$ represents hydroxy. The alkenylation can be effected using conventional procedures, for example, by reacting the free hydroxy compound with the appropriate alkenyl halide in the presence of a base such as potassium carbonate, sodium methoxide, and the like.

The indanones (VIII) wherein $R_1$ and/$R_2$ represents

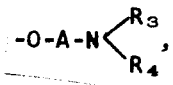

wherein A, $R_3$, and $R_4$ are as hereinbefore defined, can be obtained from the corresponding free hydroxy compounds by reaction of the latter with the appropriate tertiary-aminoalkyl halide,

wherein $R_3$, $R_4$, A, and Hal are as hereinbefore defined. The etherification is conducted advantageously in an inert solvent such as a lower alkanol, for example, methanol, ethanol, isopropyl alcohol, and the like, in the presence of a base such as potassium carbonate, sodium hydroxide, sodium methoxide, and the like.

The benzyl halides (V) which are employed as starting materials in the above-described preparation, many of which are known in the art, can themselves be prepared from the corresponding substituted benzoic acids, for example, by reduction of said acids or simple alkyl esters thereof, for example, with lithium aluminum hydride according to the procedure described by Nystrom and Brown, J. Am. Chem. Soc. 69, 2548, 1947. The benzyl alcohols so obtained are then converted to the corresponding benzyl halides (V) using procedures known in the art, for example, that described by Gilman and Kirby, J. Am. Chem. Soc. 51, 475, 1929.

The phenylacetic acids (VI), which are employed as starting materials in the above-described preparation, many of which are known in the art (see, for example, Corse et al., J. Am. Chem. Soc. 70, 2837, 1948) can themselves be prepared from the corresponding benzyl halides (V) by procedures well known in the art. For example, the benzyl halides (V) can be reacted with an alkali metal cyanide, such as sodium cyanide, to form the corresponding benzyl cyanide which latter is then hydrolyzed, for example, using an aqueous mineral acid or aqueous alkali, to yield the desired phenylacetic acid (VI). A suitable procedure for carrying out the conversion of the benzyl halide (V) to the phenylacetic acid (VI) is that described by Silverman and Bogert, J. Org. Chem. 11, 34, 1946.

The starting ketones of formula (II) wherein n is 2, i.e., the compounds of formula (II) which are α-tetralones, can be prepared, except those wherein $R_1$ and/or $R_2$ represents hydroxy, alkenyloxy, or

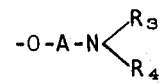

as defined above, according to the following reaction scheme:

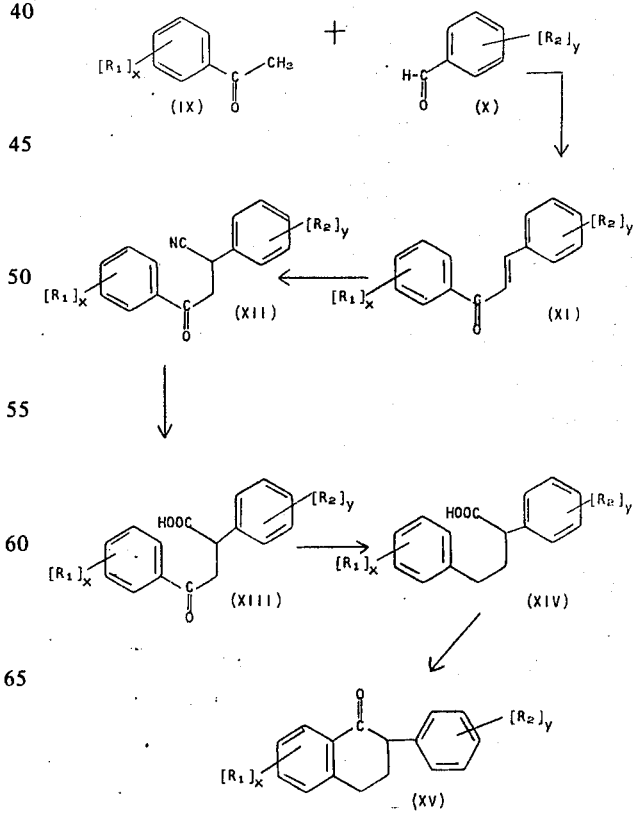

In the above reaction sequence, $R_1$, $R_2$, $x$, and $y$ have the significance hereinbefore defined with the exceptions noted above.

In the above reaction sequence, the appropriately substituted acetophenone (IX) is condensed with the appropriately substituted benzaldehyde (X) to produce the corresponding chalcone (XI) under conditions conventionally employed in the preparation of chalcones, for example, by condensation of (IX) and (X) in the presence of a base such as sodium hydroxide, potassium hydroxide, and the like, in an inert solvent such as a mixture of water and a lower alkanol, for example, methanol, ethanol, and the like. The reaction is generally conducted at or below room temperature with external cooling as required. The chalcone (XI) is isolated from the reaction mixture and purified by conventional procedures, for example, by solvent extraction followed by distillation, in the case of a liquid product, or recrystallization in the case of a solid product.

The chalcone (XI) so obtained is then converted to the corresponding nitrile (XII) by reaction with hydrogen cyanide, for example, by treatment with an alkali metal cyanide such as potassium cyanide, sodium cyanide, and the like, in the presence of acetic acid and an inert solvent such as aqueous methanol, aqueous ethanol, and the like, using the procedure described by Newman, J. Am. Chem. Soc. 60, 2947, 1938 for the conversion of benzalacetophenone (chalcone) to α-phenyl-β-benzoylpropionitrile. The desired nitrile (XII) generally separates from the reaction mixture as a solid and can be isolated by filtration and purified by recrystallization.

The nitrile (XII) so obtained is hydrolyzed to the corresponding keto acid (XIII) by conventional procedures for the hydrolysis of nitriles, for example, by heating under reflux in the presence of aqueous mineral acid such as sulfuric acid until hydrolysis is substantially complete. The desired acid (XIII) generally separates from the reaction mixture as a solid and is isolated by filtration and purified by recrystallization or by other conventional procedures, for example, by conversion to an alkali metal salt followed by acidification of the latter to regenerate the free acid.

The keto acid (XIII) so obtained is then subjected to reduction to form the corresponding acid (XIV). The reduction can be effected using any of the methods customarily employed for the conversion of a keto group to a methylene group. A particularly suitable reducing agent is amalgamated zinc and treatment of the keto acid (XIII) with amalgamated zinc in the presence of a mineral acid affords the desired acid (XIV) in excellent yield. The acid (XIV) can be isolated from the reaction mixture by conventional procedures, for example, by decantation of the liquid reaction mixture, followed by solvent extraction of the decanted liquid and evaporation of the solvent. Generally speaking, the acid (XIV) so obtained is sufficiently pure to be used in the next step of the synthesis without further treatment. If desired, however, the acid (XIV) so obtained can be purified by conventional procedures, for example, by distillation in the case of a liquid or recrystallization in the case of a solid or by conversion to an alkali metal salt followed by acidification of the latter to yield the free acid.

In the final stage of the synthesis the acid (XIV) is cyclized to the required α-tetralone (XV) in the presence of a Lewis acid, as defined above, using the general procedure described by Fieser and Hershberg, supra. The preferred Lewis acid for use in the above process is hydrogen fluoride.

A particularly convenient method of cyclizing the acid (XIV) according to the above procedure comprises adding the acid (XIV) to liquid hydrogen fluoride with stirring and then allowing the hydrogen fluoride to evaporate at about 20°–30°C. The desired α-tetralone (XV) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (XV) so obtained can be purified, if desired, by conventional procedures, for example, by recrystallization.

Alternatively, the acid (XIV) can be cyclized to the α-tetralone (XV) by conversion of the acid (XIV) to the corresponding acid chloride and treatment of the latter with aluminum chloride or stannic chloride according to the procedure described by Fieser et al., J. Am. Chem. Soc. 60, 170, 1938.

The α-tetralones (XV) wherein $R_1$ and/or $R_2$ represents hydroxy can be prepared conveniently by dealkylation of the corresponding compounds of formula (XV) wherein $R_1$ and/or $R_2$ represents alkoxy. The dealkylation can be effected using conventional methods, for example, by heating with aluminum chloride or bromide in the presence of an inert solvent such as benzene, xylene, and the like.

The α-tetralones of formula (XV) wherein $R_1$ and/or $R_2$ represents alkenyloxy can be prepared conveniently by alkenylation of the corresponding compounds wherein $R_1$ and/or $R_2$ represents hydroxy. The alkenylation can be effected using conventional procedures, for example, by reacting the free hydroxy compound with the appropriate alkenyl halide in the presence of a base such as potassium carbonate, sodium methoxide, and the like.

The α-tetralones of formula (XV) wherein $R_1$ and/or $R_2$ represents

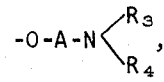

wherein A, $R_3$, and $R_4$ are as hereinbefore defined, can be prepared by etherification of the corresponding free hydroxy compounds with a tertiary-aminoalkyl halide as described above for the preparation of the corresponding compounds in the indanone series.

The acetophenones (IX) which are employed as starting materials in the above-described synthesis of the α-tetralones (XV) can be prepared from the corresponding nuclear-substituted benzoic acids by conversion of the latter to the acid chlorides followed by reaction of the latter with the appropriate dialkyl cadmium according to the procedure described in Chemical Reviews 40, 15, 1947. Many of the acetophenones (IX) are known in the literature.

The benzaldehydes (X) which are employed as starting materials in the above-described synthesis of the α-tetralones (XV) can be obtained by reduction of the corresponding substituted benzoyl chlorides using lithium tri-t-butoxyaluminum hydride using the procedure described by Brown et al., J. Am. Chem. Soc. 80, 5377, 1958. Many of the benzaldehydes of the formula (X) are known in the literature.

An alternative method for the preparation of the

α-tetralones of formula (XV) is that described by Newman, J. Am. Chem. Soc. 62, 2295, 1940. The method comprises reacting the appropriately substituted benzyl cyanide

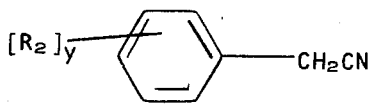

with the appropriately substituted phenethyl bromide

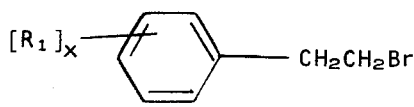

$R_1$, $R_2$, $x$, and $y$ having the significance hereinbefore defined, in the presence of sodamide and hydrolyzing the resulting nitrile to give the corresponding acid (XIV) which is then cyclized as hereinbefore described to the α-tetralone (XV).

The acid addition salts of those compounds of the invention having the formula (I) which contain a tertiary amino group can be prepared by methods well known in the art. For example, the acid addition salts of the invention can be prepared by reacting the free base with a pharmacologically (pharmaceutically) acceptable acid as hereinbefore defined, in the presence of an inert solvent such as water, ether, and lower alkanols such as methanol, ethanol, and the like.

The quaternary ammonium salts of those compounds of the invention (I) which contain a tertiary amino group can be prepared by reacting the free base of the formula (I) with a quaternating agent, for example, an alkyl halide such as methyl iodide, ethyl chloride, isopropyl bromide, and the like, an alkenyl halide such as allyl chloride, allyl bromide, and the like, dialkyl sulfate such as dimethyl sulfate, diethyl sulfate, and the like, an aralkyl halide such as benzhydryl chloride, benzyl chloride, phenethyl bromide, and the like, or an alkyl aryl sulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumberated previously, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

DETAILED DESCRIPTION

The following preparations and examples illustrate the best method contemplated by the inventor for carrying out his invention.

Preparation 1    3'-methoxychalcone

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20°C. The mixture was stirred for an additional 30 minutes in the cold and was then stirred for 27 hours at about 25°C. The resulting solution was extracted with ether and the extract was washed with saturated sodium chloride solution before being percolated through anhydrous magnesium sulfate and evaporated to dryness under reduced pressure. There was thus obtained 50.9 g. of 3'-methoxychalcone in the form of an oil having a boiling point of 180° to 185°C. at a pressure of 4 mm. of mercury.

Using the above procedure, but replacing m-methoxyacetophenone by the following known compounds: 4'-amylacetophenone, 3'-bromoacetophenone, 4'-chloroacetophenone, 4'-chloro-3'-ethylacetophenone, 5'-chloro-2'-methoxyacetophenone, 4'-ethylacetophenone, 2'-fluoroacetophenone, 3'-allyl-4'-methoxyacetophenone, 4'-methylmercaptoacetophenone, and 3'-trifluromethylacetophenone, there are obtained 4'-amylchalcone, 3'-bromochalcone, 4'-chlorochalcone, 4'-chloro-3'-ethylchalcone, 5'-chloro-2'-methoxychalcone, 4'-ethylchalcone, 2'-fluorochalcone, 3'-allyl-4'-methoxychalcone, 4'-methylmercaptochalcone, and 3'-trifluoromethylchalcone, respectively.

Similarly, using the procedure described in Preparation 1, but replacing benzaldehyde by the following known compounds; 2-bromobenzaldehyde, 5-bromo-2-methoxybenzaldehyde, 3-chlorobenzaldehyde, 2-chloro-6-fluorobenzaldehyde, 3,5-dibromo-2-ethoxybenzaldehyde, 2,3-dichlorobenzaldehyde, p-tolualdehyde, 2,6-dimethylbenzaldehyde, 4-methoxybenzaldehyde, 3,4-diethoxybenzaldehyde, 4-tert.-amyloxybenzaldehyde, 4-hexyloxybenzaldehyde, 4-methylmercaptobenzaldehyde, 4-allylbenzaldehyde, and 4-trifluoromethylbenzaldehyde, there are obtained 2-bromochalcone, 5-bromo-2-methoxychalcone, 3-chlorochalcone, 2-chloro-6-fluorochalcone, 3,5-dibromo-2-ethoxychalcone, 2,3-dichlorochalcone, 4-methylchalcone, 2,6-dimethylchalcone, 4-methoxychalcone, 3,4-diethoxychalcone, 4-tert.-amyloxychalcone, 4-hexyloxychalcone, 4-methylmercaptochalcone, 4-allylchalcone, and 4-trifluoromethylchalcone, respectively.

Preparation 2    2-phenyl-4-(3-methoxyphenyl)-4-ketobutyronitrile

A solution of 27.8 g. of potassium cyanide in 50 ml. of water was added to a mixture of 50.9 g of 3'-methoxychalcone, 13.0 g. of acetic acid, and 100 ml. of 95% ethanol over a period of 10 minutes. The temperature was maintained at 45°C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.2 g. of 2-phenyl-4-(3-methoxyphenyl)-4-ketobutyronitrile in the form of a crystalline solid having a melting point of 96° to 101°C. The infrared spectrum of the compound (minderal oil mull) exhibited maxima at 2,200, 1,660, and 1,580 reciprocal centimeters.

Using the above procedure, but replacing 3'-methoxychalcone by 4'-amylchalcone, 3'-bromochalcone, 4'-chlorochalcone, 4'-chloro-3'-ethylchalcone, 5'-chloro-2'-methoxychalcone, 4'-ethyl-chalcone, 2'-fluorochalcone, 3'-allyl-4'-methoxychalcone, 4'-methylmercaptochlacone, 3'-trifluoromethylchalcone, 2-bromochalcone, 5-bromo-2-methoxychalcone, 3-chlorochalcone, 2-chloro-6-fluorochalcone, 3,5-dibromo-2-ethoxychalcone, 2,3-dichlorochalcone, 4-methylchalcone, 2,6-dimethylchalcone, 4-methoxychalcone, 3,4-diethoxychalcone, 4-tert.-amyloxychalcone, 4-hexyloxychalcone, 4-methylmercaptochalcone, 4-allychalcone, and 4-trifluoromethylchalcone, there are obtained 2-phenyl-4-(4-amylphenyl)-4-ketobutyronitrile, 2-phenyl-4-(3-bromophenyl)-4-ketobutyronitrile, 2-phenyl-4-(4-chlorophenyl)-4-ketobutyronitrile, 2-phenyl-4-(4-chloro-3-ethylphenyl)-4-ketobutyronitrile, 2-phenyl-4-(5-chloro-2-methoxyphenyl)-4-ketobutyronitrile, 2-phenyl-4-(4-ethylphenyl)-4-ketobutyronitrile, 2-phenyl-4-(2-fluorophenyl)-4-ketobutyronitrile, 2-phenyl-4-(3-allyl-4-methoxyphenyl)-4-ketobutyronitrile, 2-phenyl-4-(4-methylmercaptophenyl)-4-ketobutyronitrile, 2-phenyl-4-(3-trifluoromethylphenyl)-4-ketobutyronitrile, 2-(2-bromophenyl)-4-phenyl-4-ketobutyronitrile, 2-(5-bromo-2-methoxyphenyl)-4-phenyl-4-ketobutyronitrile, 2-(3-chlorophenyl)-4-phenyl-4-ketobutyronitrile, 2-(2-chloro-6-fluorophenyl)-4-phenyl-4-ketobutryonitrile, 2-(3,5-dibromo-2-ethoxyphenyl)-4-phenyl-4-ketobutyronitrile, 2-(2,3-dichlorophenyl)-4-phenyl-4-ketobutyronitrile, 2-p-tolyl-4-phenyl-4-ketobutyronitrile, 2-(2,6-dimethylphenyl)-4-phenyl-4-ketobutyronitrile, 2-(4-methoxyphenyl)-4-phenyl-4-ketobutyronitrile, 2-(3,4-diethoxyphenyl)-4-phenyl-4-ketobutyronitrile, 2-(4-tert.-amyloxyphenyl)-4-phenyl-4-ketobutyronitrile, 2-(4-hexyloxyphenyl)-4-phenyl-4-ketobutyronitrile, 2-(4-methylmercaptophenyl)-4-phenyl-4-ketobutyrontirile, 2-(4-allylphenyl)-4-phenyl-4-ketobutyronitrile, and 2-(4-trifluoromethylphenyl)-4-phenyl-4-ketobutyronitrile, respectively.

Preparation 3    2-phenyl-4-(3-methoxyphenyl)-4-ketobutyric acid

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice-water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140° to 145°C. An analytical sample having a melting point of 143° to 145°C. was obtained by recrystallization from benzene.

Anal. Calcd. for $C_{17}H_{16}O_4$: C, 71.82; H, 5.67
Found: C, 72.10; H, 5.74

Using the above procedure, but replacing 2-phenyl-4-(3-methoxyphenyl)-4-ketobutyronitrile by the appropriately substituted 2,4-diphenyl-4-ketobutyronitrile (prepared as described in Preparation 2), there are obtained 2-phenyl-4-(4-amylphenyl)-4-ketobutyric acid, 2-phenyl-4-(3-(bromophenyl)-4-ketobutyric acid, 2-phenyl-4-(4-chlorophnyl)-4-ketobutyric acid, 2-phenyl-4-(4-chloro-3-ethylphenyl)-4-ketobutyric acid, 2-phenyl-4-(5-chloro-2-methoxyphenyl)-4-ketobutyric acid, 2-phenyl-4-(4-ethylphenyl)-4-ketobutyric acid, 2-phenyl-4-(2-fluorophenyl)-4-ketobutyric acid, 2-phenyl-4-(3-allyl-4-methoxyphenyl)-4-ketobutyric acid, 2-phenyl-4-(4-methylmercaptophenyl)-4-ketobutyric acid, 2-phenyl-4-(3-trifluoromethylphenyl)-4-ketobutyric acid, 2-(2-bromophenyl)-4-phenyl-4-ketobutyric acid, 2-(5-bromo-2-methoxyphenyl)-4-phenyl-4-ketobutyric acid, 2-(3-chlorophenyl)-4-phenyl-4-ketobutyric acid, 2-(2-chloro-6-fluorophenyl)-4-phenyl-4ketobutyric acid, 2-(3,5-dibromo-2-ethoxyphenyl)-4-phenyl-4-ketobutyric acid, 2-(2,3-dichlorophenyl)-4-phenyl-4-ketobutyric acid, 2-p-tolyl-4-phenyl-4-ketobutyric acid, 2-(2,6-dimethylphenyl)-4-phenyl-4-ketobutyric acid, 2-(4-methoxyphenyl)-4-phenyl-4-ketobutyric acid, 2-(3,4-diethoxyphenyl)-4-ketobutyric acid, 2-(4-tert.-amyloxyphenyl)-4-phenyl-4-ketobutyric acid, 2-(4-hexyloxyphenyl)-4-phenyl-4-ketobutyric acid, 2-(4-methylmercaptophenyl)-4-phenyl-4-4-ketobutyric acid, 2-(4-allylphenyl)-4-phenyl-4-ketobutyric acid, and 2-(4-trifluoromethylphenyl)-4-phenyl-4-ketobutyric acid, respectively.

Preparation 4    2-phenyl-4-(3-methoxyphenyl)-butyric acid

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-3-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with either and the decanted liquid was extracted with ether. The ether extract and washings were combined and washed with water and then with saturated sodium chloride solution before being percolated through anhydrous magnesium sulfate. The percolate was evaporated to dryness. There was thus obtained 26.2 g. of 2-phenyl-4-(3-methoxyphenyl)-butyric acid in the form of a viscous oil which was employed without further purification in the process of Preparation 5. The infrared spectrum of the compound (mineral oil mull) exhibited a maximum at 1,705 reciprocal centimeters.

Using the above procedure, but replacing the 2-phenyl-4-(3-methoxyphenyl-4-ketobutyric acid by the appropriately substituted 2,4-diphenyl-4-ketobutyric acid (prepared as described in Preparation 3), there are obtained 2-phenyl-4-(4-amylphenyl)-, 2-phenyl-4-(3-bromophenyl)-, 2-phenyl-4-(4-chlorophenyl)-,2-phenyl-4-(4-chloro-3-ethylphenyl)-, 2-phenyl-4-(5-chloro-2-methoxyphenyl)-, 2-phenyl-4-(4-ethylphenyl)-, 2-phenyl-4-(2-fluorophenyl-, 2-phenyl-4-methoxyphenyl)-, 2-phenyl-4-(4-methylmercaptophenyl)-, 2-phenyl-4-(3-trifluoromethylphenyl)-, 2-(2-bromophenyl)-4-phenyl-, 2-(5-bromo-2-methoxyphenyl)-4-phenyl-, 2-(3-chlorophenyl)-4-phenyl-, 2-(2-chloro-6-fluorophenyl)-4-phenyl-, 2-(3,5-dibromo-2-ethoxyphenyl)-4-phenyl-, 2-(2,3-dichlorophenyl)-4-phenyl-, 2-p-tolyl-4-phenyl-, 2-(2,6-dimethylphenyl)-4-phenyl-, 2-(4-methoxyphenyl)-4-phenyl-, 2-(3,4-diethoxyphenyl)-4-phenyl-, 2-(4-tert.-amyloxyphenyl)-4-phenyl-, 2-(4-hexyloxyphenyl)-4-phenyl-, 2-(4-methylmercaptophenyl)-4-phenyl-, 2-(4-allylphenyl)-

4-phenyl-, and 2-(4-trifluoromethylphenyl)-4-phenylbutyric acids, respectively.

Preparation 5     2-phenyl-6-methoxy-1,2,3,4-tetrahydro-1-napthalenone

A total of 150 ml. of liquid hydrogen fluoride was added to 26.2 g. of 2-phenyl-4-(3-methoxyphenyl)-butyric acid with cooling and swirling. The resulting mixture was allowed to stand at room temperature for 3 days. The residue was dissolved in methylene chloride and the solution was poured into excess concentrated aqueous potassium carbonate solution. The organic layer was separated, washed with water and saturated sodium chloride solution, and then evaporated to dryness. The residue was dissolved in 2 l. of mixed hexanes (Skellysolve B) containing 7.5% by volume of acetone and the solution was passed through a column of magnesium silicate (Florisil) prewashed with the same solvent mixture. The eluate was evaporated to dryness and the residue (17.0 g.) was recrystallized twice from cyclohexane. There was thus obtained 13.38 g. of 2-phenyl-6-methoxy-1,2,3,4-tetrahydro-1-napthalenone in the form of a crystalline compound having a melting point of 113° to 116°C.

| Anal. Calcd. for $C_{17}H_{16}O_2$: | C, 80.92; | H, 6.39 |
|---|---|---|
| Found: | C, 81.08; | H, 6.35 |

Using the above procedure, but replacing 2-phenyl-4-(3-methoxyphenyl)butyric acid by the appropriately substituted 2,4-diphenylbutyric acid (prepared as described in Preparation 4), there are obtained 2-phenyl-7-amyl-, 2-phenyl-6-bromo-, 2-phenyl-6-chloro-, 2-phenyl-7-chloro-6-ethyl-, 2-phenyl-8-chloro-5-methoxy-, 2-phenyl-7-ethyl-, 2-phenyl-5-fluoro-, 2-phenyl-6-allyl-7-methoxy-, 2-phenyl-7-methylmercapto-, 2-phenyl-6-trifluoromethyl-, 2-(2-bromophenyl)-, 2-(5-bromo-2-methoxyphenyl)-, 2-(3-chlorophenyl)-, 2-(2-chloro-6-fluorophenyl)-, 2-(3,5-dibromo-2-ethoxyphenyl)-, 2-(2,3-dichlorophenyl)-, 2-p-tolyl-, 2-(2,6-dimethylphenyl)-, 2-(4-methoxyphenyl)-, 2-(3,4-diethoxyphenyl)-, 2-(4-tert.-amyloxyphenyl)-, 2-(4-hexyloxyphenyl)-, 2-(4-methylmercaptophenyl)-, 2-(4-allylphenyl)-, and 2-(4-trifluoromethylphenyl)-1,2,3,4-tetrahydro-1-naphthalenone, respectively.

Preparation 6     2-(p-methoxyphenyl)-1-indanone

A solution of 39.0 g. (0.235 mole) of p-methoxyphenylacetic acid in 500 ml. of ether was added to a solution of potassium amide prepared from 20.4 g. (0.52 mole) of potassium in 750 ml. of liquid ammonia. To the resulting mixture was added slowly, with stirring, over a period of 10 minutes, a solution of 33.0 g. (0.26 mole) of benzyl chloride in 60 ml. of ether. The mixture was stirred for a further 30 minutes, at the end of which time an additional 3 ml. (0.003 mole) of benzyl chloride was added and the liquid ammonia was then allowed to evaporate. The residue was dissolved in water and the aqueous solution so obtained was extracted with ether and then filtered through diatomaceous earth (Celite). The filtrate was acidified by the addition of concentrated hydrochloric acid and the solid which separated was isolated by filtration and recrystallized from a mixture of chloroform and hexane. There was thus obtained 53.85 g. of α-benzyl-p-methoxyphenylacetic acid in the form of a crystalline solid having a melting point of 105° to 108°C.

The acid (53.85 g.) so obtained was added portionwise to 300 ml. of well stirred liquid hydrogen floride. The hydrogen fluoride was then allowed to evaporate at room temperature and the residue was dissolved in ether. The ethereal solution was washed successively with water, aqueous sodium bicarbonate solution, aqueous 0.5 N sodium hydroxide solution, and finally with saturated sodium chloride solution. The washed ethereal solution was dried over anhydrous sodium sulfate, filtered, and the filtrate was evaporated to dryness. The residual oily solid was dissolved in benzene and chromatographed over a column of magnesium silicate (Florisil). The column was eluted with Skellysolve B containing 5% by volume of acetone. The major crystalline fraction was recrystallized from aqueous methanol. There was thus obtained 29.73 g. of 2-(p-methoxyphenyl)-1-indanone in the form of a crystalline solid having a melting point of 74° to 79°C. An analytical sample having a melting point of 79° to 81°C. was obtained by further recrystallization from aqueous methanol.

| Anal. Calcd. for $C_{16}H_{14}O_2$: | C, 80.64; | H, 5.92 |
|---|---|---|
| Found: | C, 80.55; | H, 5.99 |

Using the procedure described in Preparation 6, but replacing p-methoxyphenylacetic acid by p-tolylacetic acid, p-chlorophenylacetic acid, p-fluorophenylacetic acid, m-trifluoromethylphenylacetic acid, p-methylmercaptophenylacetic acid, and 3-allyl-4-methoxyphenylacetic acid, there are obtained 2-(p-toly)-1-indanone, 2-(p-chlorophenyl)-1-indanone, 2-(p-fluorophenyl)-1-indanone, 2-(m-trifluoromethylphenyl)-1-indanone, 2-(p-methylmercaptophenyl)-1-indanone, and 2-(3-allyl-4-methoxyphenyl)-1-indanone, respectively.

Similarly, using the procedure described in Preparation 6, but replacing benzyl chloride by m-methoxybenzyl chloride, p-trifluoromethylbenzyl chloride, and p-(1,3-dimethylbutyl)benzyl chloride, there are obtained 2-(p-methoxyphenyl)-5-methoxy-1-indanone, 2-(p-methoxyphenyl)-6-trifluoromethyl-1-indanone, and 2-(p-methoxyphenyl)-6-(1,3-dimethylbutyl)-1-indanone, respectively.

Example 1     2-phenyl-3-(p-hydroxyphenyl)-6-methoxyindene

A mixture of 12.8 g. of p-bromophenol tetrahydropyranyl ether (Parham et al., J. Am. Chem. Soc. 70, 4187, 1948) and 1.13 g. of magnesium in 130 ml. of tetrahydrofuran was heated at reflux until the metal was all consumed. To the solution so obtained was added a solution of 10 g. of 2-phenyl-5-methoxy-1-indanone in 100 ml. of tetrahydrofuran and the resulting mixture was heated under reflux for 16 hours. At the end of this time the mixture was cooled and 10 ml. of water was added. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Stark water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25°C.) and then extracted with ether. The organic layer was separated and extracted with 5% aqueous potassium hydroxide solution. The aqueous alkaline extract was acidified by the addition of hydrochloric acid and the solid which separated was isolated by filtration and recrystallized from methanol. There was thus obtained 7.72 g. of 2-phenyl-3-(p-hydroxyphenyl)-6-methoxyindene in the form of a crystalline solid. The material was recrystallized from aqueous methanol to obtain an analytical sample having a melting point of 173° to 175°C.

Anal. Calcd. for $C_{22}H_{16}O_2$: C, 84.05; H, 5.77
Found: C, 83.59; H, 5.94

Example 2 1-(p-hydroxyphenyl)-2-phenyl-6-methoxy-3,4-dihydronaphthalene

A solution of 5.83 g. of 2-phenyl-6-methoxy-1,2,3,4-tetrahydro-1-naphthalenone in 75 ml. of tetrahydrofuran was added to a tetrahydrofuran solution containing 0.0247 mole of the Grignard reagent prepared from p-bromophenol tetrahydropyranyl ether using the procedure described in Example 1. The resulting mixture was heated under reflux for 16 hours. At the end of this time the mixture was cooled and 10 ml. of water was added. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Stark water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25°C.) and then extracted with ether. The organic layer was separated and extracted with 5% aqueous potassium hydroxide solution. The aqueous alkaline extract was acidified by the addition of hydrochloric acid and the solid which separated was isolated by filtration and dried. The material so obtained was dissolved in methylene chloride and chromatographed on a column of Florisil (magnesium silicate). The column was eluted with Skellysolve B containing increasing proportions of acetone and those fractions which, on the basis of infrared and papergram analysis, were found to contain the desired compound were combined and evaporated to dryness. The residue was recrystallized twice from cyclohexane. There was thus obtained 0.71 g. of 1-(p-hydroxyphenyl)- 2-phenyl-6-methoxy-3,4-dihydronapthalene in the form of a crystalline solid having a melting point of 130° to 131.5°C.

Anal. Calcd. for $C_{23}H_{20}O_2$: C, 84.12; H, 6.14
Found: C, 83.64; H, 5.96 s
Example 3 1-(p-hydroxyphenyl)-2-phenyl-7-amyl-3,4-dihydro-naphthalene

Using the procedure described in Example 2, but replacing 2-phenyl-6-methoxy-1,2,3,4-tetrahydro-1-naphthalenone by 2-phenyl-7-amyl-1,2,3,4-tetrahydro-1-naphthalenone, there is obtained 1-(p-hydroxyphenyl)-2-phenyl-7-amyl-3,4-dihydronaphthalene.

Similarly, using the procedure described in Example 2, but replacing 2-phenyl-6-methoxy-1,2,3,4-tetrahydro-1-naphthalenone by:
2-phenyl-6-bromo-,
2-phenyl-7-chloro-,
2-phenyl-7-chloro-6-ethyl-,
2-phenyl-8-chloro-6-methoxy-,
2-phenyl-7-ethyl-,
2-phenyl-5-fluoro,
2-phenyl-6-allyl-7-methoxy-,
2-phenyl-7-methylmercapto-,
2-phenyl-6-trifluoromethyl-,
2-(2-bromophenyl)-,
2-(5-bromo-2-methoxyphenyl)-,
2-(3-chlorophenyl)-,
2-(2-chloro-6-fluorophenyl)-,
2-(3,5-dibromo-2-ethoxyphenyl)-,
2-(2,3-dichlorophenyl)-,
2p-tolyl-,
2-(2,6-dimethylphenyl)-,
2-(4-methoxyphenyl)-,
2-(3,4-diethoxyphenyl)-,
2-(4-tert.-amyloxyphenyl)-,
2-(4-hexyloxyphenyl)-,
2-(4-methylmercaptophenyl)-,
2-(4-allylphenyl)-, and
2-(4-trifluoromethylphenyl)-1,2,3,4-tetrahydro-1-naphthalenones,
there are obtained:
1-(p-hydroxyphenyl)-2-phenyl-6-bromo-,
1(p-hydroxyphenyl)-2-phenyl-7-chloro-,
1-(p-hydroxyphenyl)-2-phenyl-7-chloro-6-ethyl-,
1-(p-hydroxyphenyl)-2-phenyl-8-chloro-6-methyl-,
1-(p-hydroxyphenyl)-2-phenyl-7-ethyl-,
1-(p-hydroxyphenyl)-2-phenyl-5-fluoro-,
1-(p-hydroxyphenyl)-2-phenyl-6-allyl-7-methoxy-,
1-(p-hydroxyphenyl)-2-phenyl-7-methylmercapto-,
1-(p-hydroxyphenyl)-2-phenyl-6-trifluoromethyl-,
1-(p-hydroxyphenyl)-2-(2-bromophenyl)-,
1-(p-hydroxyphenyl)-2-(5-bromo-2-methoxyphenyl)-,
1-(p-hydroxyphenyl)-2-(3-chlorophenyl)-,
1-(p-hydroxyphenyl)-2-(2-chloro-6-fluorophenyl)-,
1-(p-hydroxyphenyl)-2-(3,5-dibromo-2-ethoxyphenyl)-,
1-(p-hydroxyphenyl)-2-(2,3-dichlorophenyl)-, 1-(p-hydroxyphenyl)-2-p-tolyl-,
1-(p-hydroxyphenyl)-2-(2,6-dimethylphenyl)-,
1-(p-hydroxyphenyl)-2-(4-methoxyphenyl)-,
1-(p-hydroxyphenyl)-2-(3,4-diethoxyphenyl)-,
1-(p-hydroxyphenyl)-2-(4-tert.-amyloxyphenyl)-,
1-(p-hydroxyphenyl)-2-(4-hexyloxyphenyl)-,
1-(p-hydroxyphenyl)-2-(4-methylmercaptophenyl)-,
1-(p-hydroxyphenyl)-2-(4-allyloxy)-, and
1-(p-hydroxyphenyl)-2-(4-trifluoromethylphenyl)-3,4-dihydronaphthalenes, respectively.

Example 4    2-phenyl-3-(p-hydroxyphenyl)indene

Using the procedure described in Example 1, but replacing 2-phenyl-5-methoxy-1-indanone by 2-phenyl-1-indanone (v. Miller and Rohde, Ber. 25, 2095, 1892), there is obtained 2-phenyl-3-(p-hydroxyphenyl)indene.

Similarly, using the procedure described in Example 1, but replacing 2-phenyl-5-methoxy-1-indanone by:
2-(p-tolyl)-1-indanone,
2-(p-chlorophenyl)-1-indanone,
2-(p-fluorophenyl)-1-indanone,
2-(p-methoxyphenyl)-1-indanone,
2-(p-fluorophenyl)-1-indanone,
2-(m-trifluoromethylphenyl)-1-indanone,
2-(p-methylmercaptophenyl)-1-indanone,
2-(3-allyl-4-methoxyphenyl)-1-indanone,
2-(p-methoxyphenyl)-5-methoxy-1-indanone,
2-(p-methoxyphenyl)-6-trifluoromethyl-1-indanone, and
2-(p-methoxyphenyl)-6-(1,3-dimethylbutyl)-1-indanone,
there are obtained:
2-(p-tolyl)-,
2-(p-chlorophenyl)-,
2-(p-methoxyphenyl)-,
2-(p-fluorophenyl)-,
2-(m-trifluoromethylphenyl)-,
2-(p-methylmercaptophenyl)-,
2-(3-allyl-4-methoxyphenyl)-,
2-(p-methoxyphenyl)-6-methoxy-,
2-(p-methoxyphenyl)-5-trifluoromethyl, and
2-(p-methoxyphenyl)-5-(1,3-dimethylbutyl)-3-(p-hydroxyphenyl)indenes, respectively.

Example 5    2,3-bis(p-hydroxyphenyl)indene

A. 2-(p-hydroxyphenyl)-1-indanone

A mixture of 2-(p-methoxyphenyl)-1-indanone and aluminium bromide in benzene is heated according to the procedure described by Sam, J. Am. Chem. Soc. 82, 5205, 1960 to obtain 2-(p-hydroxyphenyl)-1-indanone.

B. 2-(p-2-tetrahydropyranyloxyphenyl)-1-indanone

A solution of 2-(p-hydroxyphenyl)-1-indanone in ether is treated with an equimolar quantity of 2,3-dihydropyran and one drop of concentrated hydrochloric acid. The mixture so obtained is allowed to stand for several hours, washed with very dilute aqueous sodium hydroxide solution, then with water, and taken to dryness. There is thus obtained 2-(p-2-tetrahydropyranyloxyphenyl)-1-indanone.

C. 2,3-bis(p-hydroxyphenyl)indene

Using the procedure described in Example 1, but replacing 2-phenyl-5-methoxy-1-indanone by 2-(p-2-tetrahydropyranyloxphenyl)-1-indanone, there is obtained 2,3-bis(p-hydroxyphenyl)-indene.

Example 6    2-(p-allyloxyphenyl)-3-(p-hydroxyphenyl)indene

A. 2-(p-allyloxyphenyl)-1-indanone

A solution of 2-(p-hydroxyphenyl)-1-indanone (Example 5, Part A) in methanol containing a slight excess of sodium methoxide is treated slowly with stirring with an excess of allyl chloride. When the addition is complete the mixture is heated under reflux for several hours before being cooled and poured into water. The resulting mixture is extracted with ether and the ethereal extract is washed with aqueous sodium hydroxide solution and with water before being evaporated to dryness to yield 2-(p-allyloxy-phenyl)-1-indanone.

B. 2-(p-allyloxyphenyl)-3-(p-hydroxyphenyl)indene

Using the procedure described in Example 1, but replacing 2-phenyl-5-methoxy-1-indanone by 2-(p-allyloxyphenyl)-1-indanone, there is obtained 2-(p-allyloxyphenyl)-3-(p-hydroxyphenyl)indene.

Example 7    2-(p-diethylaminoethoxyphenyl)-3-(p-hydroxyphenyl)-indene and the hydrochloride thereof A. 2-(p-2-diethylaminoethoxyphenyl)-1-indanone To a suspension of 4.95 g. of 2-(p-hydroxyphenyl)-1-indanone in 100 ml. of ethanol, there is added 4.32 g. of 25% w/w sodium methoxide in methanol. The resulting mixture is stirred for 1 hour before being treated with a solution of 6.0 g. of 2-diethylaminoethyl chloride in 200 ml. of ethanol. The mixture so obtained is heated under reflux for 20 hours before being cooled and evaporated to dryness under reduced pressure. The residue is treated with a mixture of water, ether, and methylene chloride. The organic layer is separated, washed with dilute aqueous potassium hydroxide and then with saturated sodium chloride solution and dried over anhydrous sodium sulfate and the residue is recrystallized from methanol. The dried solution is filtered, the filtrate is evaporated to dryness, and the residue is recrystallized from methanol. There is thus obtained 2-(p-2-diethylaminoethoxyphenyl)-1-indanone.

B. 2-(p-2-diethylaminoethoxyphenyl)-3-(p-hydroxyphenyl)-indene

Using the procedure described in Example 1, but replacing 2-phenyl-5-methoxy-1-indanone by 2-(p-2-diethylaminoethoxyphenyl)-1-indanone, there is obtained 2-(p-2-diethylaminoethoxyphenyl)-3-(p-hydroxyphenyl)indene.

C. 2-(p-2-diethylaminoethoxyphenyl)-3-(p-hydroxyphenyl)-indene hydrochloride

A solution of 1 g. of 2-(p-2-diethylaminoethoxyphenyl)-3-(p-hydroxyphenyl)indene in 25 ml. of anhydrous ether is treated with a slight excess of an ethereal solution of hydrogen chloride. The solid which separates is isolated by filtration, washed with ether, and dried in vacuo. There is thus obtained 2-(p-2-diethylaminoethoxyphenyl)-3-(p-hydroxyphenyl)indene hydrochloride in the form of a crystalline solid.

Similarly, using the procedure set forth in Example 7, Parts A, B, and C, but replacing the 2-diethylaminoethyl chloride employed in Part A by:
3-diethylaminopropyl chloride,
2-diethylaminopropyl bromide,
2-dibutylaminoethyl chloride
2-N-methyl-N-ethylaminoethyl bromide,
3-diethylaminobutyl chloride,
5-dimethylaminopentyl chloride,
2-diethylaminopentyl chloride,
6-dimethylaminohexyl chloride,
2-pyrrolidinoethyl chloride, 3-(2,2-dimethylpyrrolidino)propyl chloride,
2-piperidinoethyl chloride,
2-morpholinoethyl chloride,
2-(1'-methyl-4'-piperazino)ethyl chloride,
2-hexamethyleniminoethyl chloride,
2-homopiperazinoethyl chloride, and
2-homomorpholinoethyl bromide,
there are obtained:
2-(p-3-diethylaminopropoxyphenyl)-,
2-(p-2-diethylaminopropoxyphenyl)-,
2-(p-2-dibutylaminoethoxyphenyl)-,
2-(p-2-N-methyl-N-ethylaminoethoxyphenyl)-,
2-(p-3-diethylaminobutyoxyphenyl)-,
2-(p-5-dimethylaminopentoxyphenyl)-,
2-(p-2-diethylaminopentoxyphenyl)-,
2-(p-6-dimethylaminohexyloxyphenyl)-,
2-(p-2-pyrrolidinoethoxyphenyl)-,
2-[p-3-(2,2-dimethylpyrrolidino)propoxyphenyl]-,
2-(p-2-piperidinoethoxyphenyl)-,
2-(p-2-morpholinoethoxyphenyl)-,
2-[p-2-(1'-methyl-4'-piperazino)ethoxyphenyl]-,
2-(p-2-hexamethyleniminoethoxyphenyl)-,
2-(p-2-homopiperazinoethoxyphenyl)-, and
2-(p-2-homomorpholinoethoxyphenyl-3-(p-hydroxyphenyl)-indenes, respectively, and the hydrochlorides of each of the above compounds.

Example 8    2-phenyl-3-(o-hydroxyphenyl)-6-methoxyindene

Using the procedure described in Example 1, but replacing p-bromophenol tetrahydropyranyl ether by o-bromophenol tetrahydropyranyl ether, there is obtained 2-phenyl-3-(o-hydroxyphenyl)-6-methoxyindene.

Similarly, using the procedure described in Example 1, but replacing p-bromophenol tetrahydropyranyl ether by m-bromophenol tetrahydropyranyl ether, there is obtained 2-phenyl-3-(m-hydroxyphenyl)-6-methoxyindene.

Example 9    1-(p-hydroxyphenyl)-2-phenyl-6-hydroxy-3,4-dihydronapthalene

A.    2-phenyl-6-hydroxy-1,2,3,4-tetrahydro-1-naphthalenone

Using the procedure described in Example 5, Part A, but replacing 2-(p-methoxyphenol)-1-indanone by 2-phenyl-6-methoxy-1,2,3,4-tetrahydro-1-napthalenone, there is obtained 2-phenyl-6-hydroxy-1,2,3,4-tetrahydro-1-naphthalenone having a melting point of 180° to 185°C. An analytical sample having a melting point of 183° to 185.5°C. was obtained by recrystallization from chloroform.

Anal. Calcd. for $C_{16}H_{14}O_2$: C, 80.64; H, 5.92
Found: C, 80.19; H, 6.17

B.    2-phenyl-6-(2-tetrahydropyranyloxy)-1,2,3,4-tetrahydro-1-naphthalenone

Using the procedure described in Example 4, Part B, but replacing 2-(p-hydroxyphenyl)-1-indanone by 2-phenyl-6-hydroxy-1,2,3,4-tetrahydro-1-naphthalenone, there is obtained 2-phenyl-6-(2-tetrahydropyranyloxy)-1,2,3,4-tetrahydro-1-naphthalenone.

C.    1-(p-hydroxyphenyl)-2-phenyl-6-hydroxy-3,4-dihydronaphthalene

Using the procedure described in Example 2, but replacing 2-phenyl-6-methoxy-1,2,3,4-tetrahydro-1-naphthalenone by 2-phenyl-6-(2-tetrahydropyranyloxy)-1,2,3,4-tetrahydro-1-naphthalenone, there is obtained 1-(p-hydroxyphenyl)-2-phenyl-6-hydroxy-3,4-dihydronaphthalene.

Example 10    1-(p-hydroxyphenyl)-2-phenyl-6-(2-diethylaminoethoxy)-3,4-dihydronaphthalene and the hydrochloride thereof A.    2-phenyl-6-(2-diethylaminoethoxy)-1,2,3,4-tetrahydro-1-naphthalenone A suspension of 11.6 g. of 2-phenyl-6-hydroxy-1,2,3,4-tetrahydro-1-naphthalenone (Example 9, Part A) in 200 ml. of methanol was treated with 10 ml. of 4.8 M sodium methoxide in methanol solution. The mixture was stirred for 15 minutes before adding 13.2 g. of a 1:1 mixture of 2-diethylaminoethyl chloride in toluene. The mixture so obtained was heated under reflux for 17 hours before removing the solvent under reduced pressure. The residue was treated with a mixture of water and methylene chloride and the organic layer was separated, washed with water and then with brine, and evaporated to dryness. The residue was dissolved in 40 ml. of ethanol and treated with 120 ml. of saturated ethanolic picric acid. The solid which separated was isolated by filtration and recrystallized from acetonitrile. There was thus obtained 13.15 g. of 2-phenyl-6-(2-diethylaminoethoxy)-1,2,3,4-tetrahydro-1-naphthalenone in the form of its picrate having a melting point of 180° to 184°C. An analytical sample having a melting point of 185° to 186°C. was obtained by further recrystallization from the same solvent.

| | C | H | N |
|---|---|---|---|
| Anal. Calcd. for $C_{28}H_{30}N_4O_9$: | 59.36; | 5.34; | 9.89 |
| Found: | 59.19; | 5.45; | 9.99 |

B.    1-(p-hydroxyphenyl)-2-phenyl-6-(2-diethylaminoethoxy)- 3,4-dihydronaphthalene and the hydrochloride thereof A mixture of 7.46 g. of the picrate prepared as described in Part A above, 50 ml. of methylene chloride and 50 ml. of approximately 14% ammonium hydroxide was shaken at room temperature for 2 hours. The organic layer was separated, washed once with aqueous ammonia, then with water, and with brine, and evaporated to dryness. A solution of the residue in 50 ml. of tetrahydrofuran was added to the Grignard reagent obtained from 7.70 g. of the tetrahydropyranyl ether of p-bromophenol and 0.73 g. of magnesium in 80 ml. of tetrahydrofuran. The resulting mixture was heated under reflux for 17 hours before being cooled and decomposed by the careful addition of water. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was suspended in 150 ml. of 2.5 N hydrochlorid acid. The solid which separated was isolated by filtration and recrystallized from a mixture of methanol and 2.5 N hydrochloric acid and then from a mixture of methanol and acetonitrile. There was thus obtained 3.20 g. of 1-(p-hydroxyphenyl)-2-phenyl-6-(2-diethylaminoethoxy)-3,4-dihydronaphthalene hydrochloride having a melting point of 232° to 236°C. An analytical sample having a melting point of 233° to 235.5°C. was obtained by further recrystallization from the same solvent mixture.

|  | C | H | Cl |
|---|---|---|---|
| Anal. Calcd for $C_{28}H_{32}ClNO_2$: | 74.73; | 7.17; | 7.88 |
| Found: | 74.21; | 7.35; | 7.96 |

A suspension of 1 g. of the hydrochloride so obtained in 50 ml. of ether is shaken with aqueous sodium bicarbonate solution and the ether layer is separated and evaporated to dryness. There is thus obtained 1-(p-hydroxyphenyl)-2-phenyl-6-(2-diethylaminoethoxy)-3,4-dihydronaphthalene.

Similarly, using the procedure described in Example 10, Parts A and B, but replacing the 2-diethylaminoethyl chloride employed in Part A by:
   3-diethylaminopropyl chloride,
   2-diethylaminopropyl bromide,
   2-dibutylaminoethyl chloride,
   2-N-methyl-N-ethylaminoethyl bromide,
   3-diethylaminobutyl chloride,
   5-dimethylaminopentyl chloride,
   2-diethylaminopentyl chloride,
   6-dimethylaminohexyl chloride,
   2-pyrrolidinoethyl chloride,
   3-(2,2-dimethylpyrrolidino)propyl chloride,
   2-piperidinoethyl chloride,
   2-morpholinoethyl chloride,
   2-(1'-methyl-4'-piperazino)ethyl chloride,
   2-hexamethyleniminoethyl chloride,
   2-homopiperazinoethyl chloride, and
   2-homomorpholinoethyl bromide,
there are obtained:
   1-(P-hydroxyphenyl)-2-phenyl-6-(3-diethylaminopropoxy)-,
   1-(p-hydroxyphenyl)-2-phenyl-6-(2-diethylaminopropoxy)-,
   1-(p-hydroxyphenyl)-2-phenyl-6-(2-dibutylaminoethoxy)-,
   1-(p-hydroxyphenyl)-2-phenyl-6-(2-N-methyl-N-ethylaminoethoxy)-,
   1-(p-hydroxyphenyl)-2-phenyl-6-(3-diethylaminobutoxy)-,
   1-(p-hydroxyphenyl)-2-phenyl-6-(5-dimethylaminopentoxy)-,
   1-(p-hydroxyphenyl)-2-phenyl-6-(2-diethylaminopentoxy)-,
   1-(p-hydroxyphenyl)-2-phenyl-6-(6-dimethylaminohexyloxy)-,
   1-(p-hydroxyphenyl)-2-phenyl-6-(2-pyrrolidinoethoxy)-,
   1-(p-hydroxyphenyl)-2-phenyl-6-[3-(2,2-dimethylpyrrolidino) propoxy]-,
   1-(p-hydroxyphenyl)-2-phenyl-6-(2-piperidinoethoxy)-,
   1-(p-hydroxyphenyl)-2-phenyl-6-(2-morpholinoethoxy)-,
   1-(p-hydroxyphenyl)-2-phenyl-6-[2-(1'-methyl-4'-piperazino) ethoxy]-,
   1-(p-hydroxyphenyl)-2-phenyl-6-(2-hexamethyleniminoethoxy)-,
   1-(p-hydroxyphenyl)-2-phenyl-6-(2-homopiperazinoethoxy)-, and
   1-(p-hydroxyphenyl)-2-phenyl-6-(2-homomorpholinoethoxy)-3,4-dihydronaphthalenes, respectively, and the hydrochlorides of the above-named compounds.

Example 11   1-(m-hydroxyphenyl)-2-phenyl-6-methoxy-3,4-dihydronaphthalene

Using the procedure described in Example 2, but replacing the Grignard reagent prepared from p-bromophenol tetrahydropyranyl ether by the Grignard reagent prepared from m-bromophenol tetrahydropyranyl ether, there is obtained 1-(m-hydroxyphenyl)-2-phenyl-6-methoxy-3,4-dihydronaphthalene.

Similarly, using the procedure of Example 2, but using the Grignard reagent prepared from o-bromophenol tetrahydropyranyl ether, there is obtained 1-(o-hydroxyphenyl)-2-phenyl-6-methoxy-3,4-dihydronaphthalene.

Example 12   2-(p-2-diethylaminoethoxyphenyl)-3-(p-hydroxyphenyl)indene hydrobromide 12

To a solution of 1 g. of 2-(p-diethylaminoethoxyphenyl)-3-(p-hydroxyphenyl)indene in 100 ml. of ether is added dropwise, with stirring, a slight excess of a 0.1 N etheral solution of hydrogen bromide. The solid which separates is isolated by filtration, washed with ether, and dried. There is thus obtained 2-(p-2-diethylaminoethoxyphenyl)-3-(p-hydroxyphenyl)indene hydrobromide.

In like manner, employing any of the free amino compounds set forth in Examples 7 and 10, and the appropriate acid, there are obtained the corresponding acid addition salts. Illustratively, using procedures analogous to those described above, the amines of Examples 7 and 10 are converted to their acid addition salts with sulfuric, nitric, phosphoric, lactic, benzoic, methanesulfonic, p-toluenesulfonic, salicylic, acetic, propionic, malic, tartaric, citric, cyclohexylsulfamic, succinic, nicotinic, and ascorbic acids.

Example 13   2-(p-2-diethylaminoethoxyphenyl)-3-(p-hydroxyphenyl)indene methiodide A solution of 1 g. of 2-(p-diethylaminoethoxyphenyl)-3-(p-hydroxyphenyl)indene in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 2-(p-2-diethylaminoethoxyphenyl)-3-(p-hydroxyphenyl)indene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide and benzyl bromide, respectively, of 2-(p-2-diethylaminoethoxyphenyl)-3-(p-hydroxyphenyl)indene.

Similarly, using the procedure described in Example 13, but replacing 2-(p-2-diethylaminoethoxyphenyl)-3-(p-hydroxyphenyl)-indene by any of the free bases prepared as described in Examples 7 and 10, there are obtained the corresponding methiodides and like quaternary ammonium salts.

Example 14   2-(p-2-diethylaminoethoxyphenyl)-3-(p-hydroxyphenyl)indene methochloride A solution of 1 g. of 2-(p-2-diethylaminoethoxyphenyl)-3-(p-hydroxyphenyl)indene methiodide in dimethylformamide is shaken with a suspension of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 2-(p-2-diethylaminoethoxyphenyl)-3-(p-hydroxyphenyl)indene methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary salts of the invention can be exchanged by any other desired anion by forming the corresponding quaternary ammonium hydroxide and reacting the latter with the appropriate acid.

Example 15    Sodium salt of 2-phenyl-3-(p-hydroxyphenyl)-6-methoxyindene

To a solution of 1 g. of 2-phenyl-3-(p-hydroxyphenyl)-6-methoxyindene in 20 ml. of methanol is added 1 equivalent of aqueous N sodium hydroxide solution. The resulting solution is evaporated to dryness under reduced pressure. There is thus obtained the sodium salt of 2-phenyl-3-(p-hydroxyphenyl)-6-methoxyindene.

Similarly, using the above procedure but replacing sodium hydroxide by potassium hydroxide and lithium hydroxide, there are obtained the corresponding potassium and lithium salts.

Similarly, using the above procedure the free phenols set forth in Examples 1 through 11 can be converted to their alkali metal salts such as the sodium, potassium, and lithium salts.

I claim:

1. A member of the group consisting of 1-(p-hydroxyphenyl)-2-phenyl-6-(2-diethylaminoethoxy)-3,4-dihydronaphthalene and the hydrochloride thereof.

* * * * *